(12) United States Patent
Schmidt et al.

(10) Patent No.: US 9,467,395 B2
(45) Date of Patent: Oct. 11, 2016

(54) CLOUD COMPUTING NODES FOR AGGREGATING CLOUD COMPUTING RESOURCES FROM MULTIPLE SOURCES

(71) Applicant: VMware, Inc., Palo Alto, CA (US)

(72) Inventors: Rene W. Schmidt, Risskov (DK); Jan Moeller, Galten (DK); Marc Ryan Sweet, Vashon, WA (US)

(73) Assignee: VMware, Inc., Palo Alto, CA (US)

( * ) Notice: Subject to any disclaimer, the term of this patent is extended or adjusted under 35 U.S.C. 154(b) by 586 days.

(21) Appl. No.: 13/800,543

(22) Filed: Mar. 13, 2013

(65) Prior Publication Data

US 2014/0280948 A1    Sep. 18, 2014

(51) Int. Cl.
| | |
|---|---|
| *G06F 15/173* | (2006.01) |
| *H04L 12/911* | (2013.01) |
| *G06F 9/455* | (2006.01) |
| *G06F 9/50* | (2006.01) |
| *H04L 29/06* | (2006.01) |
| *G06F 21/00* | (2013.01) |
| *H04L 12/24* | (2006.01) |

(52) U.S. Cl.
CPC ............. *H04L 47/827* (2013.01); *G06F 9/455* (2013.01); *G06F 9/45558* (2013.01); *G06F 9/5072* (2013.01); *G06F 21/00* (2013.01); *H04L 63/00* (2013.01); *H04L 63/0272* (2013.01); *G06F 2009/4557* (2013.01); *H04L 41/5096* (2013.01)

(58) Field of Classification Search
CPC ...................... G06F 2009/4557; G06F 9/5072; H04L 47/827; H04L 63/0272; H04L 67/10
USPC .................................................. 709/223, 226
See application file for complete search history.

(56) References Cited

U.S. PATENT DOCUMENTS

| | | | | |
|---|---|---|---|---|
| 8,762,429 | B1 * | 6/2014 | Reeves ............. | G06F 17/30233 707/812 |
| 2008/0240122 | A1 * | 10/2008 | Richardson ......... | H04L 12/4641 370/401 |
| 2009/0183152 | A1 * | 7/2009 | Yang .................... | G06F 9/5072 718/1 |
| 2009/0307211 | A1 * | 12/2009 | Kenig ............... | G06F 17/30864 |
| 2011/0016214 | A1 * | 1/2011 | Jackson ................ | G06F 9/5044 709/226 |
| 2011/0055398 | A1 * | 3/2011 | Dehaan ................. | G06F 9/5077 709/226 |
| 2012/0005359 | A1 * | 1/2012 | Seago ................... | G06F 9/5044 709/230 |
| 2012/0179824 | A1 * | 7/2012 | Jackson ................ | G06F 9/5027 709/226 |
| 2013/0097601 | A1 * | 4/2013 | Podvratnik .......... | G06F 9/5027 718/1 |
| 2013/0246208 | A1 * | 9/2013 | Jain .......................... | G06F 9/50 705/26.3 |
| 2014/0090037 | A1 * | 3/2014 | Singh .................. | H04L 63/0815 726/7 |
| 2014/0351396 | A1 * | 11/2014 | Stabile ................. | H04L 41/044 709/223 |
| 2015/0106813 | A1 * | 4/2015 | Mihalocivi .......... | H04L 47/125 718/1 |
| 2015/0146716 | A1 * | 5/2015 | Olivier ............... | H04L 65/1016 370/352 |
| 2015/0195354 | A1 * | 7/2015 | Lyon .................. | H04N 21/2385 709/203 |

\* cited by examiner

*Primary Examiner* — Mohamed Wasel

(57) ABSTRACT

A disclosed example method to aggregate resources in a cloud involves receiving a request for a resource at a first tenant application programming interface provider of an internal cloud service. The example method involves using a virtualization platform application programming interface client of the internal cloud service to access the resource when the resource is an internal resource. When the resource is an external resource, a tenant application programming interface client of the internal cloud service is used to send a second request for the resource to a second tenant application programming interface provider of an external cloud service.

20 Claims, 9 Drawing Sheets

HYBRID CLOUD

CLOUD COMPUTING NODES FOR AGGREGATING CLOUD COMPUTING RESOURCES FROM MULTIPLE SOURCES

FIELD OF THE DISCLOSURE

The present disclosure relates generally to cloud computing and, more particularly, to cloud computing nodes.

BACKGROUND

Internal cloud architectures and external cloud architectures are used in cloud computing and cloud storage systems for offering infrastructure as a service (IaaS) cloud services. Examples of internal and external cloud architectures include the VMware vCloud® Director cloud architecture software, Amazon EC2® web service, and OpenStack® open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. In internal and external cloud architectures, tenants and physical infrastructure are kept separate from one another. Some tenant APIs include the notion of users and permissions on objects to control who has access to different tenant-facing resources (e.g., virtual data centers (VDCs), VMs, and networks) inside the IaaS.

DETAILED DESCRIPTION

Figure 1:
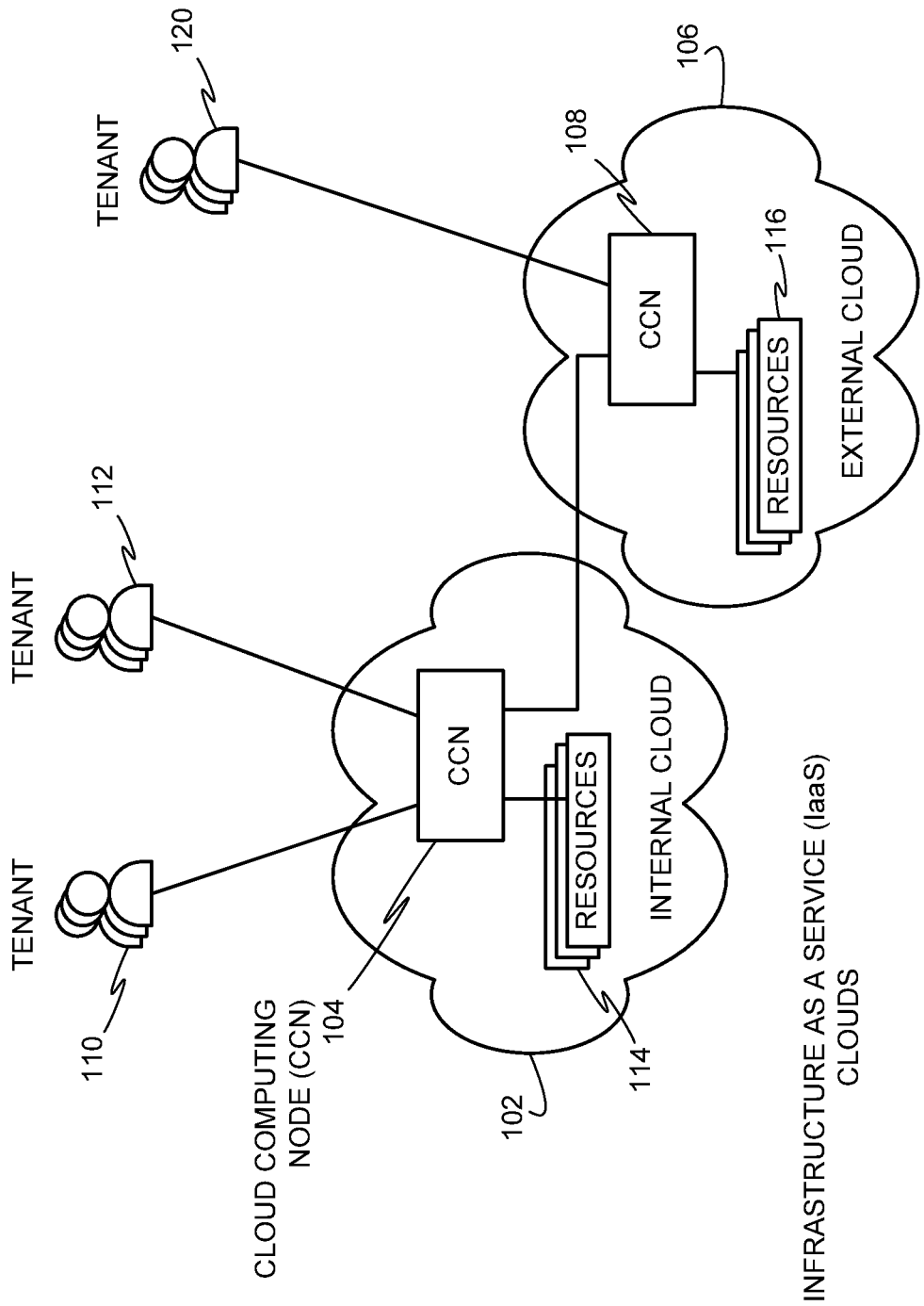
FIG. 1 depicts example cloud computing services in which example teachings of this disclosure may be used.

Example cloud computing nodes (CCNs) disclosed herein facilitate implementing and managing different types of cloud architectures. Disclosed example CCNs are configured as building block interfaces that enable interconnecting different cloud computing systems to provide end users (e.g., tenants) with cloud services that use resources aggregated from the different cloud systems while appearing as part of a seamless or unified cloud to the end users. To provide such unified cloud services, an example CCN includes a tenant application programming interface (API) provider in communication with a virtual data center (VDC) of the CCN. The example CCN also includes a cloud resource pool of aggregated resources delegatable to the VDC for use by the tenant API provider. In addition, the example CCN includes a tenant API client in communication with the cloud resource pool. The tenant API client is configured to communicate with an external CCN to aggregate at least some of the resources from another cloud service associated with the external CCN. Disclosed example CCNs aggregate capacity from both the physical infrastructure of a corresponding cloud service, and from external CCNs associated with external cloud services. Disclosed example CCNs delegate those resources into VDCs, in which virtual machines (VMs) can be deployed. Disclosed example CCNs may be organized into flexible topologies that cover multiple different types of hybrid cloud architectures. Example cloud architectures in which example CCNs disclosed herein may be used include internal cloud architectures, external cloud architectures, hybrid cloud architectures, and cloud reseller architectures. Although specific types of cloud architectures are discussed herein, example CCNs disclosed herein may also be used to implement other types of cloud architectures not discussed herein.

In examples disclosed herein, an internal cloud is a cloud in which a tenant and a cloud service provider are part of the same organization. In examples disclosed herein, an external cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In examples disclosed herein, a hybrid could is a cloud architecture in which a tenant is provided with seamless access to both internal cloud resources and external cloud resources. For example, a VDC corresponding to a particular tenant may access resources spanning across multiple cloud providers to provide the tenant with access to such resources from the different ones of the multiple cloud providers. Example CCNs disclosed herein facilitate establishing such hybrid clouds so that a hybrid cloud tenant need not know which cloud service provider(s) are providing its resources and so that the hybrid cloud tenant need not handle different interfaces (e.g., different APIs) to access resources from different service providers forming the hybrid cloud. Example CCNs disclosed herein provide a tenant with a single tenant API through which the tenant can access all resources provided by a hybrid cloud in a seamless manner without needing to know whether the resources are internal resource or external resources. In disclosed examples, the CCNs handle aggregation and management of resources from different cloud service providers that form the hybrid cloud without requiring the tenant to know of such aggregation and management of hybrid resources from the different providers. In some examples, tenants access the tenant APIs of CCNs through different client interfaces including dedicated cloud service client applications, web browsers, mobile apps, file system explorers/navigators, etc.

Examples disclosed herein are described in connection with infrastructure as a service (IaaS) cloud services. However, disclosed example CCNs may be adapted for use with other types of cloud services including, for example, software as a service (SaaS) and platform as a service (PaaS) cloud services. IaaS cloud services are cloud offerings that allow a tenant to deploy one or more VMs useable by the tenant to run applications or other software. The VMs run according to corresponding service level agreements (SLAs) made between corresponding tenants and corresponding IaaS providers. IaaS services enable tenants to dynamically increase or decrease the number of resources needed from IaaS providers on demand. In IaaS services, tenants are unaware of the physical infrastructure implementing the IaaS services. The entity that provides an IaaS service is an IaaS provider. An IaaS provider can be an internal information technology (IT) organization or an external public cloud provider (e.g., Amazon, Terremark, etc.). Disclosed example CCNs facilitate providing a tenant with an IaaS service formed of resources aggregated from two or more separate service providers without requiring the overhead of specialized, tenant-specific or service-specific specialty configurations of prior cloud services that join multiple service providers to provide a single IaaS service to a tenant.

In examples disclosed herein, a tenant (e.g., an IaaS tenant) is a user of an IaaS. The tenant is responsible for deploying workloads in the form of VMs or multi-VM configurations in the IaaS. A tenant of an IaaS is isolated from other tenants of the same IaaS. In some examples, a tenant is an organization (e.g., an enterprise) including multiple people or users. In other examples, a tenant may be a single user.

To provide tenants with access to cloud resources, disclosed example CCNs are provided with VDCs. In examples disclosed herein, a tenant accesses the IaaS through a VDC object. Disclosed example CCNs make cloud resources available via VMs that are deployed on VDCs. In examples disclosed herein, a VDC is uniquely accessible by a tenant in the same way that an account in an IaaS service uniquely corresponds to a particular tenant. In disclosed examples, VDCs are logically isolated from each other in that two tenants with access to two different VDCs of the same IaaS service provided by a CCN are unaware of each other, and unable to access and modify each other's VMs (e.g., cloud resources). In some examples, a VDC provides tenants with access to the same internet (e.g., a same inter-network network). In this manner, VMs deployed in one VDC can communicate to VMs in another VDC (e.g., based on modulo restrictions enforced by, for example, a firewall rule) using internet communications (e.g., internet protocol (IP)/hypertext transfer protocol (HTTP) communications). In examples disclosed herein, VMs are deployed on an underlying physical infrastructure (e.g., physical resources) shared by multiple tenants. Thus, although the tenants of a single CCN share physical resources, the logical resources (e.g., the VMs) are separate and not shared between the tenants.

FIG. 1 depicts an example cloud service 102 having a CCN 104, and a cloud service 106 having a CCN 108. In the illustrated example, the CCN 104 provides tenants 110 and 112 with access to resources 114 of the cloud service 102 and/or to resources 116 of the cloud service 106. In the illustrated example, the cloud service 102 may be an internal cloud provided by an enterprise, and the tenants 110 and 112 may be different business divisions of the enterprise that access logically separated resources aggregated by the CCN 104 from the resources 114 of the cloud service 102 and/or from the resources 116 of the cloud service 106. The cloud service 106 of the illustrated example may be an external cloud provided by a cloud service provider (e.g., a business such as Amazon or Terremark that specializes in providing cloud-based solutions to different enterprises and/or individuals). In the illustrated example, the CCN 104 of the cloud service 102 communicates with the CCN 108 of the cloud service 106 so that the CCN 104 can aggregate one or more of the resources 114 and/or one or more of the resources 116 to provide the tenant 110 and/or the tenant 112 with seamless access to the aggregated resources 114 and/or 116.

The CCN 104 of the illustrated example is useful to provide service offering flexibilities to different users. For example, the same CCN 104 is useable to provide some tenants with internal-only cloud services that provide access only to internal cloud resources, and to provide some tenants with hybrid cloud services that provide access to internal and external cloud resources. In some examples, the CCN 104 may provide only internal cloud access to the tenant 110 and hybrid cloud access to the tenant 112. In such examples, the CCN 104 provides the tenant 110 with access to only the resources 114 of the cloud service 102 in accordance with an internal cloud access SLA of the tenant 110. Also in such examples, the tenant 112 can access any combination of the resources 114 of the cloud service 102 and the resources 116 of the cloud service 106 in accordance with a hybrid cloud access SLA of the tenant 112. Under such hybrid cloud access services, the tenant 112 need only interface with a tenant API (e.g., one of the tenant API providers 206a-c of FIG. 2) of the CCN 104, and the CCN 104 manages communications with the CCN 108 to aggregate and manage one or more of the resources 116 for use by the tenant 112.

In the illustrated example, the cloud service 106 may provide IaaS cloud services to a tenant 120. In the illustrated example, the CCN 108 of the cloud service 106 is able to provide hybrid cloud services to the tenant 112 in connection with the CCN 104 and to provide single-provider cloud services to the tenant 120. That is, the same CCN 108 is re-useable, or simultaneously useable to provide hybrid cloud services and single-provider cloud services to different tenants or different CCNs according to different SLAs.

Figure 2:
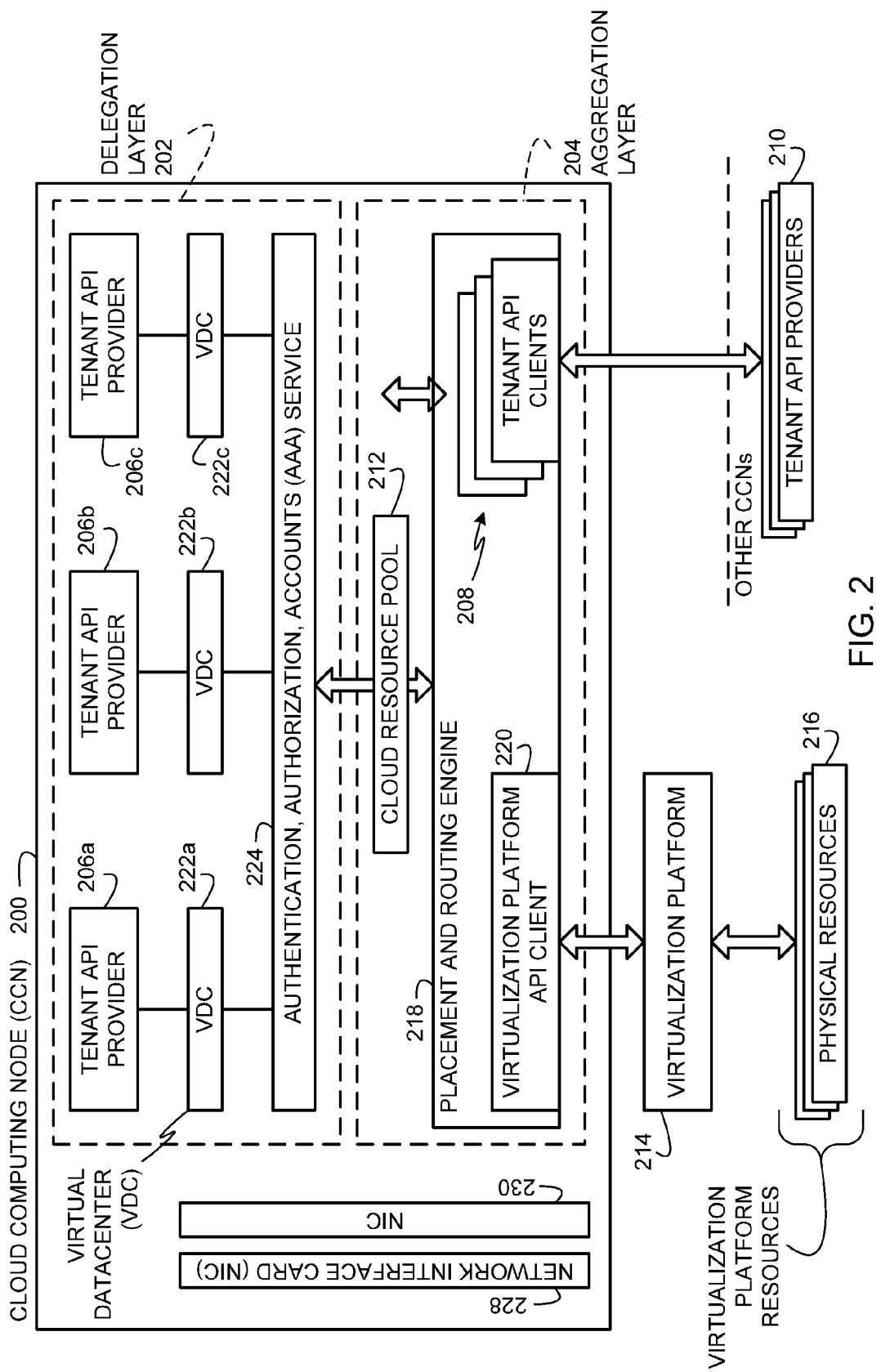
FIG. 2 depicts an example cloud computing node (CCN).

FIG. 2 depicts an example CCN 200, which may be used to implement the CCN 104 and/or the CCN 108 of FIG. 1. The example CCN 200 is a universal building block for cloud infrastructures that can be used alone or in combination with other CCNs to implement internal, external, and/or hybrid cloud architectures. The CCN 200 of the illustrated example aggregates resources from multiple sources. Example sources can be one or more virtualization platforms (e.g., VMware ESX, VMware vCenter, Xen hypervisor, etc.) and/or one or more other CCNs. For example, the CCN 104 of FIG. 1 may use the resources 114 of the cloud service 102 or may access the resources 116 of the cloud service 106 via the CCN 108. In the illustrated example, the CCN 200 aggregates resources for use by one or more tenants (e.g., one or more of the tenants 110, 112, and/or 120 of FIG. 1).

The CCN 200 of the illustrated example includes a delegation layer 202 and an aggregation layer 204. The delegation layer 202 of the illustrated example provides an interface for tenants (e.g., the tenants 110, 112, and/or 120 of FIG. 1) to access virtualized resources based on resources aggregated by the aggregation layer 204. The delegation layer 202 of the illustrated example also provides other CCNs with access to virtualized resources based on resources aggregated by the aggregation layer 204. For example, a delegation layer (e.g., similar to the delegation layer 202 of FIG. 2) of the CCN 108 of FIG. 1 provides the tenant 120 and the CCN 104 with access to virtualized resources (e.g., VMs) that run on one or more of the resources 116 of FIG. 1.

To provide tenants (e.g., the tenants 110, 112, and/or 120 of FIG. 1) and/or other CCNs with access to and/or management of cloud services and/or resources, the delegation layer 202 of the illustrated example is provided with tenant API providers 206a-c. Although three tenant API providers 206a-c are shown at the delegation layer 202, fewer or more tenant API providers 206a-c may be provided at the delegation layer 202. In the illustrated example, the tenant API providers 206a-c are exposed as end-user API interfaces to enable tenants to interact with an IaaS cloud service (e.g., the cloud service 102 and/or the cloud service 106 of FIG. 1). The tenant API providers 206a-c of the illustrated example are also used by the CCN 200 to deploy VMs (e.g., virtualized resources) in response to tenant requests. The example tenant API providers 206a-c control lifecycles of VMs based on different VM management procedures such as "create" VMs, "configure" VMs, VM "power-ops" (e.g., power operations such as power on, power off, reset, suspend, shutdown, etc.), "destroy" VMs, etc.

In the illustrated example, to enable inter-CCN communications and/or inter-CCN cloud service management, the example CCN is provided with one or more tenant API clients 208 at the aggregation layer 204. In the illustrated example, the tenant API clients 208 communicate with tenant API providers 210 (e.g., similar to the tenant API providers 206a-c) of other CCNs to enable hybrid cloud services.

Figure 9:
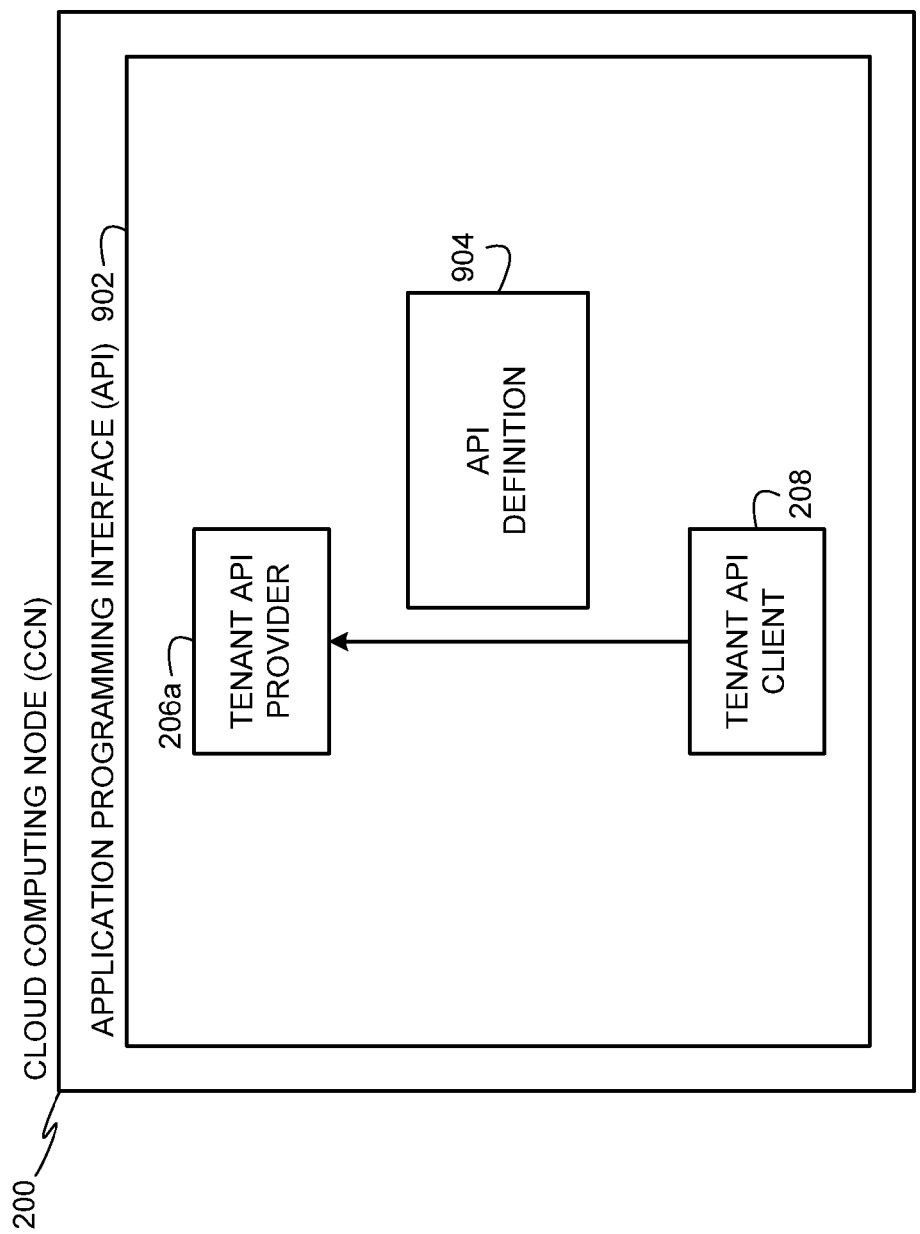
FIG. 9 depicts a tenant application programming interface (API) provider and a tenant API client of FIG. 2 as part of a same example API implemented in the CCN of FIG. 2.

Referring briefly to FIG. 9, the tenant API provider 206a and the tenant API client 208 are shown as part of a same example API 902 implemented in the example CCN 200 of FIG. 2. The example API 902 is a protocol between the tenant API provider 206a and the tenant API client 208. The API 902 defines how a client (e.g., a tenant or user) can implement a method or methods on the CCN 200, which implements the API 902. In the illustrated example of FIG. 9, the tenant API provider 206a operates as a server that implements the API 902 for clients (e.g., tenants or users) that access the API 902 via the tenant API provider 206a. Also in the illustrated example, the tenant API client 208 of the CCN 200 operates as a tenant or user that invokes methods of other APIs implemented in other CCNs by accessing those other APIs via corresponding tenant API providers (e.g., tenant API providers 210 of FIG. 2) of those other APIs in the other CCNs.

In the illustrated example, the API 902 includes an example API definition 904 that specifies routines, functions, protocols, data formats, etc. for the API 902, the tenant API provider 206a, and the tenant API client 208. For example, the API definition 904 may define how information is to be exchanged between the tenant API provider 206a and the tenant API client 208 and how information is to be handled (e.g., changed, provided, etc.) by the API 902. In some examples, multiple separate APIs 902 are implemented in the CCN 200 for different ones of the tenant API clients 206a-c and/or different ones of the tenant API providers 208. Although the tenant API clients 208 are shown separate from the tenant API providers 206a-c in the CCN 200, in some examples, the same tenant API for a corresponding tenant is configured to implement tenant API provider procedures and tenant API client procedures. In such examples, the same tenant API has interfaces at both the delegation layer 202 to interact with tenants and at the aggregation layer 204 to interact with other CCNs.

Figure 10:
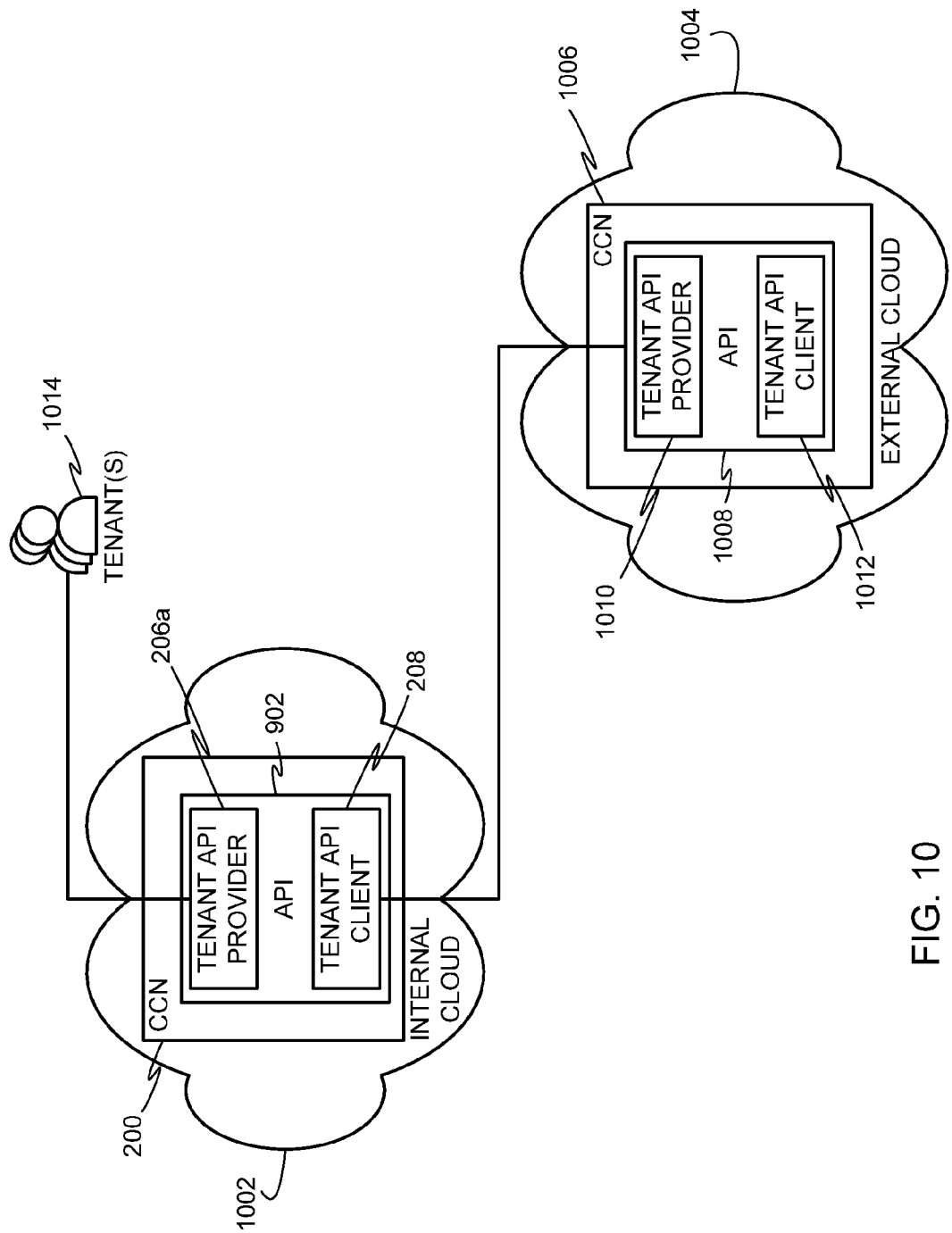
FIG. 10 depicts the example API of FIG. 9 in communication with another example API of another CCN in a separate cloud service.

Referring briefly to FIG. 10, an example cloud service 1002 (e.g., substantially similar or identical to the cloud service 102 of FIG. 1) is provided with the CCN 200 having the example API 902 of FIG. 9, and an example cloud service 1004 (e.g., substantially similar or identical to the cloud service 106 of FIG. 1) is provided with an example CCN 1006 having an example API 1008 (e.g., similar or identical to the API 902). In the illustrated example, the cloud service 1002 is an internal cloud service, and the cloud service 1004 is an external cloud service. The API 1008 of the illustrated example is provided with a tenant API provider 1010 (e.g., similar or identical to the tenant API provider 206a) and with a tenant API client 1012 (e.g., similar or identical to the tenant API client 208). In the illustrated example of FIG. 10, the tenant API provider 206a of the API 902 interfaces with one or more tenants 1014. Also in the illustrated example, the tenant API client 208 of the API 902 is in communication with the tenant API provider 1010 of the example API 1008 of the example CCN 1006 of the cloud service 1004. In this manner, the example CCN 200 can provide the one or more tenants 1014 with access to internal resources of the cloud service 1002 and/or external resources from the cloud service 1004 without informing the one or more tenants 1014 whether the resources are internal resources or external resources.

Referring again to FIG. 2, in some examples, the tenant API clients 208 are configured to migrate VMs between different IaaS providers (e.g., VMs between the internal cloud service 102 and the external cloud service 106 of FIG. 1). In some such examples, the tenant API clients 208 may perform VM migrations as cold migrations such as when VMs are powered off, or as live migrations such as when VMs are powered on. By configuring the tenant API clients 208 with the ability to move VMs around during runtime, the CCN 200 is provided with more opportunities to improve placements of VMs at runtime. In this manner, if resources requested by a tenant dynamically change during runtime, the CCN 200 can substantially reduce or eliminate inefficiencies in VM placements (e.g., the CCN 200 can perform VM placement optimization) by using the tenant API clients 208 to power down, destroy, move, etc. VMs.

The tenant API clients 208 of the illustrated example are also configured to connect networks together across different IaaS providers (e.g., networks across the cloud services 102 and 106 of FIG. 1). In this manner, VMs deployed across different IaaS providers can communicate with one another on private and secure virtual networks (e.g., inter-CCN virtual networks). In some examples, the tenant API providers 206a-c and the tenant API clients 208 are configured to create secure, private virtual networks across VMs of the CCN 200 (e.g., intra-CCN virtual networks) by, for example, deploying virtual private network (VPN) gateways at different VMs separated by a public internet, and connecting the VMs over a secure, private virtual network via the VPN gateways.

By providing the tenant API providers 206a-c at the delegation layer 202 and the tenant API clients 208 at the aggregation layer 204, the example CCN 200 of FIG. 2 is able to implement cloud architectures of different configurations and different topologies. That is, examples disclosed herein enable implementing different types of cloud architectures for different uses or types of services by arranging CCNs in different desired topologies based on the tenant API providers 206a-c operating as egress information/service/resource providers and the tenant API clients 208 operating as ingress information/service/resource receivers. Different example configurations and topologies such as internal cloud architectures, external cloud architectures, hybrid cloud architectures, and reseller cloud architectures are discussed in detail below in connection with FIGS. 3-6.

To aggregate resources for use by tenants (e.g., the tenants 110, 112, and 120 of FIG. 1), the CCN 200 of the illustrated example is provided with an example cloud resource pool 212 in the aggregation layer 204. The cloud resource pool 212 stores aggregated resources virtualized through a virtualization platform 214 (e.g., VMware ESX, VMware vCenter, Xen hypervisor, etc.). In the illustrated example, the virtualization platform 214 aggregates virtual resources that run on physical resources 216. In the illustrated example, the physical resources 216 may be computers, servers, printers, scanners, storage devices, etc. In the illustrated example, the virtual resources of the cloud resource pool 212 may be reserved logical partitions or logical portions (e.g., time slices or amounts of processing, storage, printing, scanning, etc.) apportioned by the virtualization platform 214 on the physical resources 216.

Referring briefly to the illustrated example of FIG. 1, the resources 114 and 116 are physical resources such as the physical resources 216 of FIG. 2. In addition, the CCNs 104 and 108 are provided with corresponding cloud resource pools (e.g., similar to the cloud resource pool 212 of FIG. 2) that aggregate virtual resources that run on the physical resources 114 and 116 through a virtualization platform (e.g., the virtualization platform 214 of FIG. 2). In this manner, the CCN 104 of FIG. 1 can access virtual resources that run on the physical resources 114 of the cloud service 102, and the CCN 104 can also access, through the CCN 108, virtual resources that run on the physical resources 116 of the cloud service 106.

In the illustrated example of FIG. 2, to access virtual resources from the virtualization platform 214, the cloud resource pool 212 is in communication with a placement and routing engine 218 in the aggregation layer 204. In the illustrated example, the placement and routing engine 218 includes the tenant API clients 208. Also in the illustrated example, the placement and routing engine 218 includes a virtualization platform API client 220 to access virtual resources through the virtualization platform 214. The placement and routing engine 218 of the illustrated example performs placement and routing processes to place and route virtual resources accessed through the virtualization platform 214 for use by tenants through different ones of the tenant API providers 206a-c.

In the illustrated example of FIG. 2, to provide tenants (e.g., the tenants 110, 112, and 120 of FIG. 1) access to virtual resources aggregated in the cloud resource pool 212, the CCN 200 is provided with virtual data centers (VDCs) 222a-c in the delegation layer 202. In the illustrated example, each of the VDCs 222a-c is accessible independently by a corresponding tenant via a corresponding one of the tenant API providers 206a-c. The tenant API providers 206a-c of the illustrated example delegate the virtual resources in the cloud resource pool 212 to corresponding ones of the VDCs 222a-c for access by corresponding tenants via the VDCs 222a-c. In the illustrated example, virtual resources are delegated in the VDCs 222a-c as VMs instantiated and managed by, for example, the virtualization platform 214.

In the illustrated example, aggregated virtual resources in the cloud resource pool 212 are used to provision VMs based on requests from tenants of the CCN 200. As such, the CCN 200 of the illustrated example places (e.g., creates) the VMs in aggregated virtual resource capacity provided by the virtualization platform(s) 214 and/or provided by other CCNs in communication with the CCN 200. Over time, dynamic placement of VMs (e.g., creating and destroying VMs) may create challenges in keeping well-optimized or efficient placements of VMs as VMs are constantly evaluated for the best possible (e.g., cheapest) placements in the aggregated virtual resources of the cloud resource pool 212. To substantially reduce or eliminate such VM placement challenges, the placement and routing engine 218 of the illustrated example is configured to migrate VMs to different virtual resources as discussed above (e.g., as cold migrations or live migrations) by invoking commands through the tenant API clients 208 when the tenant API clients 208 find better placements for different VMs.

In the illustrated example, the tenant API client 208 can expand and/or restrict features of the physical resources 216 from which it aggregates virtual resources in the cloud resource pool 212. Examples of such expandable or restrictable value-add features include advanced VM placement policies (e.g., a placement policy that allows distributing a set of VMs across two of the VDCs 222a-c) and/or the ability to explicitly choose between high-available zones of resources for VM creation and not-so-high-available zones of resources for VM creation.

To authenticate and authorize users and permissions, the CCN 200 of the illustrated example is provided with an authentication, authorization, accounts (AAA) service 224 in the delegation layer 202. In the illustrated example, permission checking is performed by the AAA service 224 and is isolated in the delegation layer 202 of the CCN 200. In this manner, users and accounts are maintained only in the delegation layer 202, and the user and account information is never propagated to underlying resources (e.g., resource in the cloud resource pool 212 or aggregated from other CCNs) in the aggregation layer 204. In the illustrated example, for a tenant authenticated and authorized by the AAA service 224, the aggregation layer 204 of the CCN 200 is configured to connect to that tenant via a corresponding tenant API (e.g., one of the tenant API providers 206a-c). In this manner, exchanges with that tenant are isolated to the CCN 200 so that the tenant's exchanges with the CCN 200 remain separate from other CCNs. In this manner, examples disclosed herein enable decoupling or isolating tenants/users in the delegation layer 202 of the CCN 200 from tenants/users in remote CCNs. Using the AAA service 224 to manage access to virtual resources in this manner is useful, for example, to an enterprise that prefers not to upload all its employees' information and passwords to third-party cloud providers. In this manner, sensitive information is maintained at the enterprise (e.g., in the internal cloud) using security standards enforced by the enterprise. Using the AAA service 224 to manage access to virtual resources is also useful to simplify or substantially reduce the amount of information that needs to be propagated through a CCN topology. For example, the AAA service 224 can be configured to manage authentications and authorizations of tenants based on different polices to access resources, rather than needing to propagate user identifiers, passwords, and/or other credentials of tenants to external CCNs (e.g., the CCN 106 of FIG. 1, or to the virtualization platform 214 or the physical resources 216. Managing access to virtual resources using the AAA service 224 also enables arbitrary nesting of CCNs while being able to keep secure partitions and restricted access privileges between tenants and resources.

The example CCN 200 of FIG. 2 does not increase performance overhead or adversely affect performance of VMs. In the illustrated examples, disclosed example CCNs create VMs to run directly on a virtualization host such as the virtualization platform 214, and the VMs offer services directly on aggregated network resources (e.g., aggregated network resources in the cloud resource pool 212). As such, disclosed example CCNs can be used in highly nested configurations without significantly reducing VM performance.

The example CCN 200 of FIG. 2 may be implemented using different types of alternate path configurations to, for example, manage load balancing, resource availability, and connection failures. Example alternate path configurations that are useable with the example CCN 200 of FIG. 2 include active/passive configurations and active/active configurations across two sites (e.g., across the cloud services 102 and 106 of FIG. 1). To facilitate the alternate path configurations, the example CCN 200 is provided with two network interface card (NIC) adapters 228 and 230 in the illustrated example. In active/passive configurations, the NIC adapter 228 is a primary NIC adapter and the NIC adapter 230 is a standby NIC adapter. In active/standby configurations, the standby NIC adapter 230 is inactive until it is needed to assume the role of the primary NIC adapter 228. That is, the standby NIC adapter 230 can takeover in response to failure, congestion, or unavailability of the primary NIC adapter 228. In active/active configurations, both of the NIC adapters 228 and 230 are active at the same time to concurrently manage load balancing. In active/active configurations, either of the NIC adapters 228 or 230 can assume full management responsibilities in response to the failure, congestion, or unavailability of the other NIC adapter 228 or 230.

While an example manner of implementing the CCN 200 has been illustrated in FIG. 2, one or more of the elements, processes and/or devices illustrated in FIG. 2 may be combined, divided, re-arranged, omitted, eliminated and/or implemented in any other way. Further, the example tenant API providers 206a-c, the example API clients 208, the example cloud resource pool 212, the placement and routing engine 218, the virtualization platform API client 220, the example VDCs 222a-c, the example AAA service 224 and/or, more generally, the example CCN 200 of FIG. 2 may be implemented by hardware, software, firmware and/or any combination of hardware, software and/or firmware. Thus, for example, any of the example tenant API providers 206a-c, the example tenant API clients 208, the example cloud resource pool 212, the placement and routing engine 218, the virtualization platform API client 220, the example VDCs 222a-c, the example AAA service 224 and/or, more generally, the example CCN 200 could be implemented using one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example tenant API providers 206a-c, the example tenant API clients 208, the example cloud resource pool 212, the placement and routing engine 218, the virtualization platform API client 220, the example VDCs 222a-c, and/or the example AAA service 224 are hereby expressly defined to include a tangible computer readable storage device or storage disk such as a memory, a digital versatile disk (DVD), a compact disk (CD), a Blu-ray disk, etc. storing the software and/or firmware. Further still, the example CCN 200 of FIG. 2 may include one or more elements, processes and/or devices in addition to, or instead of, those illustrated in FIG. 2, and/or may include more than one of any or all of the illustrated elements, processes and devices.

Figure 3:
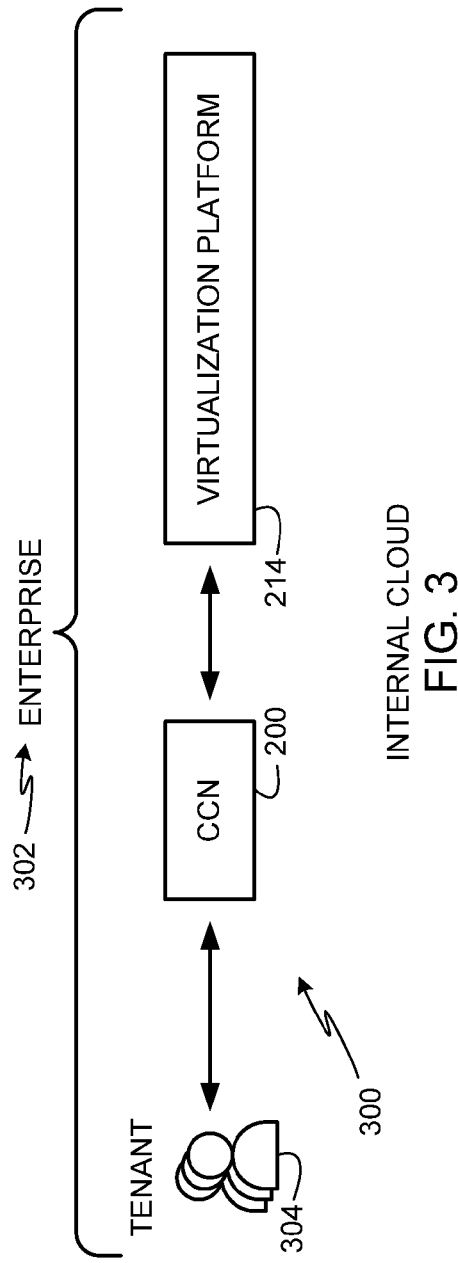
FIG. 3 depicts an example internal cloud architecture implemented using the CCN of FIG. 2.

FIG. 3 depicts an example internal cloud architecture 300 that may be implemented using the CCN 200 of FIG. 2. In the illustrated example, the internal cloud 300 is implemented by an IT organization of an enterprise 302 to provide access to IaaS resources to a tenant 304 (e.g., users or employees of the enterprise). In the illustrated example of FIG. 3, a single CCN 200 is used to implement the internal cloud architecture 300 to provide the tenant 304 access to virtualized internal resources provided by the virtualization platform 214. Although a single CCN 200 is shown in the example internal cloud architecture 300 of FIG. 3, the internal cloud architecture 300 may be implemented using any number of nested CCNs internal to the enterprise 302 to provide the tenant 304 access to resources of the enterprise 302.

In the illustrated example of FIG. 3, a tenant API client 208 (FIG. 2) is used to aggregate virtual resources into the cloud resource pool 212 (FIG. 2) from the virtualization platform 214 run by the enterprise 302, and a corresponding one of the tenant API providers 206a-c (FIG. 2) is used to delegate the virtual resources (e.g., VMs) to the corresponding tenant 304. In the illustrated example, user authentications of the tenant 304 and permissions are enforced by the AAA service 224 (FIG. 2) of the CCN 200 at the enterprise 302 based on user and account information maintained at the enterprise 302 and based on policies of the enterprise 302.

Figure 4:
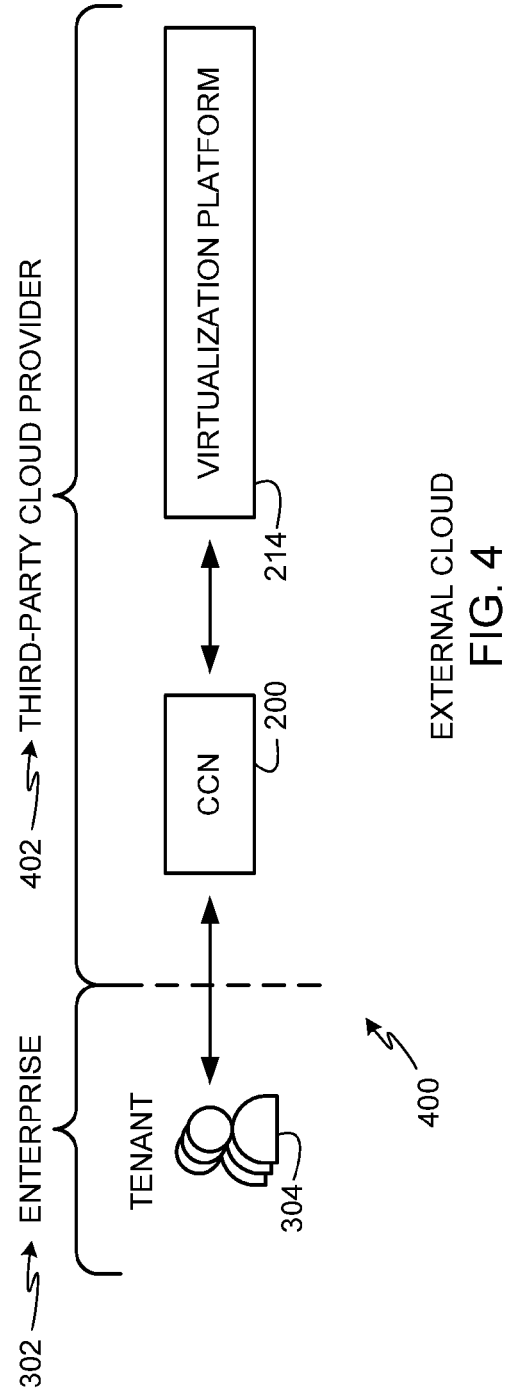
FIG. 4 depicts an example external cloud architecture implemented using the CCN of FIG. 2.

FIG. 4 depicts an example external cloud architecture 400 that may be implemented using the CCN 200 of FIG. 2. In the illustrated example of FIG. 4, the tenant 304 of the enterprise 302 is provided with third-party IaaS cloud service from a third-party cloud provider 402 that implements the external cloud architecture 400. In the illustrated example of FIG. 4, a single CCN 200 is used to implement the external cloud architecture 400 to provide the tenant 304 with access to virtualized external resources provided by the virtualization platform 214. Although a single CCN 200 is shown in the external cloud architecture 400 of FIG. 4, the external cloud architecture 400 may be implemented using any number of nested CCNs in the third-party cloud provider 402 external to the enterprise 302 to provide the tenant 304 access to external resources of the third-party cloud provider 402.

In the illustrated example of FIG. 4, a tenant API client 208 (FIG. 2) is used to aggregate virtual resources into the cloud resource pool 212 (FIG. 2) from the virtualization platform 214 run by the third-party cloud provider 402, and a corresponding one of the tenant API providers 206a-c (FIG. 2) is used to delegate the virtual resources (e.g., VMs) to the corresponding tenant 304 across separate logical networks of the enterprise 302 and the third-party cloud provider 402. In the illustrated example, user authentications of the tenant 304 and user permissions are enforced by the AAA service 224 (FIG. 2) of the CCN 200 at the third-party cloud provider 402 based on user and account information from the enterprise 302 and/or the third-party cloud provider 402 and based on policies of the enterprise 302 and/or the third-party cloud provider 402.

Figure 5:
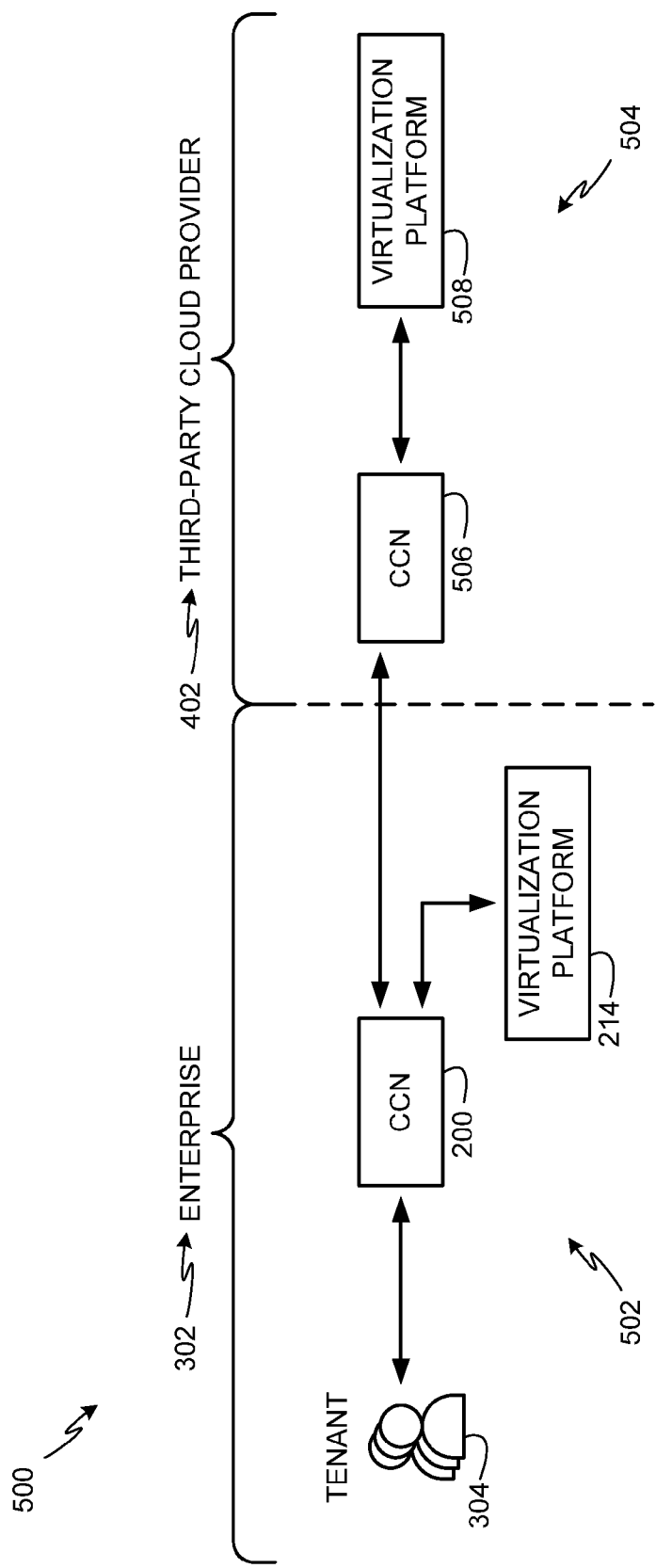
FIG. 5 depicts an example hybrid cloud architecture implemented using the CCN of FIG. 2.

FIG. 5 depicts an example hybrid cloud architecture 500 that may be implemented using the CCN 200 of FIG. 2. In the illustrated example of FIG. 5, the tenant 304 of the enterprise 302 is provided with a hybrid IaaS cloud service from the hybrid cloud architecture 500 implemented by the example enterprise 302 of FIG. 3 and by the example third-party cloud provider 402 of FIG. 4. In the illustrated example, the hybrid cloud architecture 500 includes an internal cloud service 502 implemented by the enterprise 302 and an external cloud service 504 implemented by the third-party cloud provider 402. The internal cloud service 502 includes the CCN 200 and the virtualization platform 214, and the external cloud service 504 includes a CCN 506 (e.g., substantially similar or identical to the CCN 200) and a virtualization platform 508 (e.g., substantially similar or identical to the virtualization platform 508). In some examples, the virtualization platform 214 may be omitted from the internal cloud service 502, and the enterprise 302 may instead use only the virtualization platform 508 of the third-party cloud provider 402 via the CCN 200 and the CCN 506.

In the illustrated example of FIG. 5, the two CCNs 200 and 506 are in communication with one another to implement the hybrid cloud architecture 500 to provide the tenant 304 with seamless access to virtualized internal resources provided by the virtualization platform 214 of the enterprise 302 and seamless access to virtualized external resources provided by the virtualization platform 508 of the third-party cloud provider 402. In the illustrated example of FIG. 5, a tenant API client 208 (FIG. 2) of the CCN 200 is used to aggregate virtual internal resources into the cloud resource pool 212 from the virtualization platform 214 run by the enterprise 302, and to aggregate virtual external resources from the virtualization platform 508 run by the third-party cloud provider 402. For example, to aggregate resources from the third-party cloud provider 402, the tenant API client 208 of the CCN 200 communicates with a tenant API provider (e.g., substantially similar or identical to the tenant API providers 206a-c of FIG. 2) of the CCN 506. In such examples, the tenant API provider of the CCN 506 acknowledges or treats the tenant API client 208 of the CCN 200 as a tenant that requests resources from the CCN 506.

Inter-cloud interactions between the CCN 200 and the CCN 506 to aggregate resources requested by the tenant 304 are transparent to the tenant 304. That is, the CCN 200 and the CCN 506 perform such inter-cloud interactions without the tenant API providers 206a-c and/or the tenant API clients 208 exposing to the tenant 304 whether resources are provisioned through the CCN 200 as internal resources or through the CCN 506 as external resources. Thus, the tenant need not be aware of, and need not manage, any of the inter-cloud interactions between the CCNs 200 and 506. In this manner, the tenant 304 is unaware of whether resources delegated to it are provisioned at the internal cloud service 502 or at the external cloud service 504.

In the illustrated example, the tenant 304 can log into the CCN 200 and seamlessly deploy VMs across multiple cloud providers regardless of whether the cloud providers are internal cloud providers or external cloud providers. For example, one of the tenant API providers 206a-c corresponding to the tenant 304 is used to delegate to the corresponding tenant 304 aggregated virtual resources (e.g., VMs) aggregated across the enterprise 302 and the third-party cloud provider 402. In the illustrated example, user authentications of the tenant 304 and user permissions are enforced by the AAA service 224 (FIG. 2) of the CCN 200 at the internal cloud service 502 based on user and account information of the enterprise 302. In the illustrated example of FIG. 5, by using the AAA service 224 of the CCN 200, the enterprise 302 need not expose its sensitive user and account information to the third-party cloud provider 402. Instead, the AAA service 224 provides authentication, authorization, and accounts services for user and account information of the enterprise 302 in the CCN 200 without exposing such user and account information to the third-party cloud provider 402.

In some examples, the CCN 506 of the external cloud service 504 implements an AAA service (e.g., substantially similar or identical to the AAA service 224) to perform user authentications and/or enforce user permissions on communications from the CCN 200. In such examples, the third-party cloud provider 402 treats the CCN 200 as a user or tenant of its services and enforces its policies on the CCN 200 using its AAA services.

Figure 6:
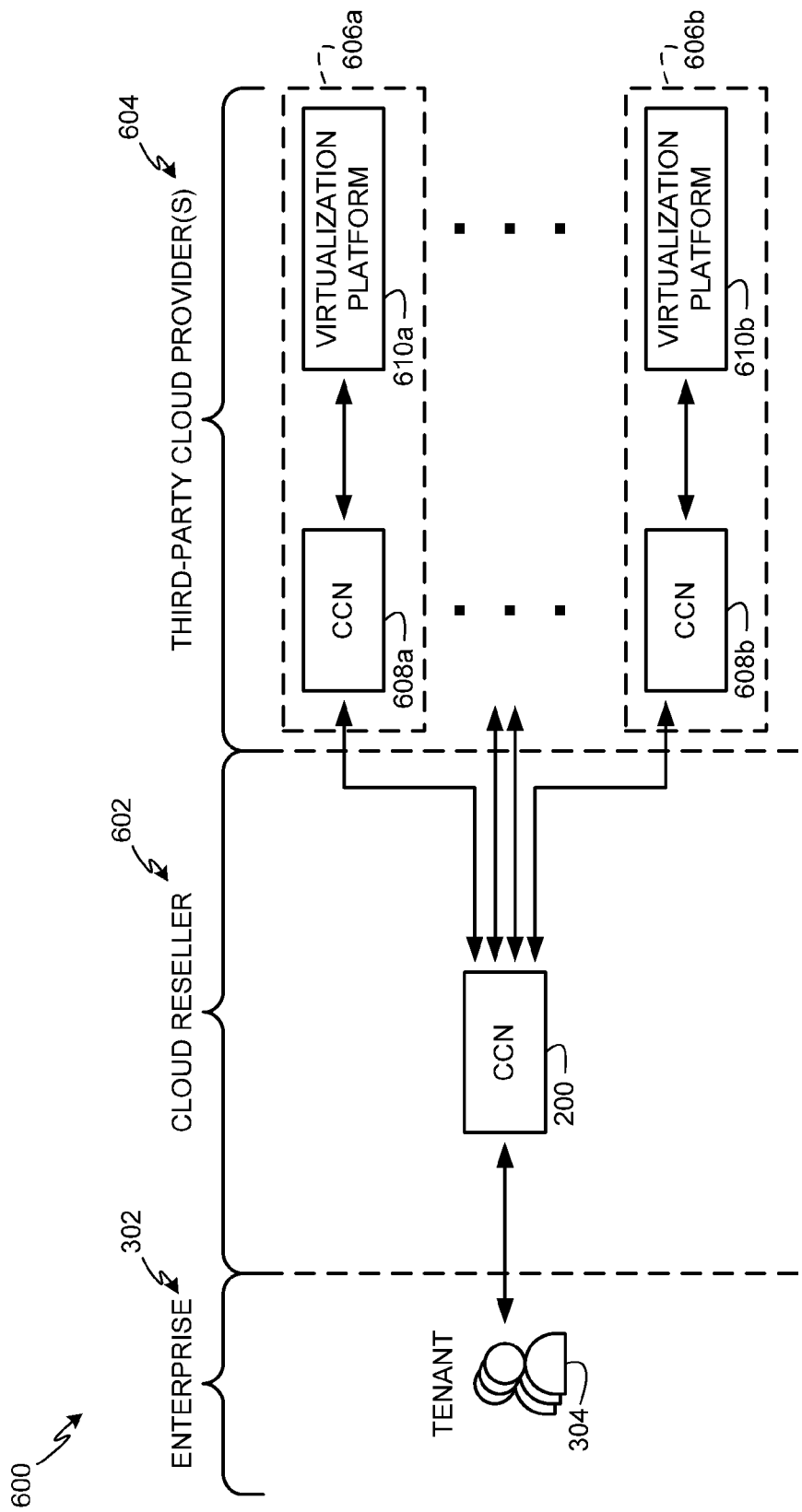
FIG. 6 depicts an example cloud reseller architecture implemented using the CCN of FIG. 2.

FIG. 6 depicts an example cloud reseller architecture 600 that may be implemented using the CCN 200 of FIG. 2. In the illustrated example of FIG. 6, the tenant 304 of the enterprise 302 is provided with an IaaS cloud service from cloud reseller 602 that resells use of external resources provided by one or more third-party cloud providers 604. In the illustrated example, the reseller cloud architecture 600 includes the CCN 200 in communication with one or more third-party cloud services 606a-b of the third-party cloud providers 604. Although two third-party cloud services 606a-b are shown, the third-party cloud providers 604 may include any number of third-party cloud services. In the illustrated example, the third-party cloud services 606a-b include corresponding CCNs 608a-b (e.g., substantially similar or identical to the CCN 200) to perform inter-cloud communications with the CCN 200 of the cloud reseller 602. In this manner, the CCN 200 of the cloud reseller 602 can aggregate external resources from the third-party cloud services 606a-b to resell use of those resources to the enterprise 302. In the illustrated example, the cloud reseller 602 does not maintain or provide its own resources (e.g., the physical resources 216 of FIG. 2). As such, the cloud reseller 602 of the illustrated example does not include a virtualization platform (e.g., the virtualization platform 214 of FIG. 2). In the illustrated example, the third-party cloud services 606a-b are provided with corresponding virtualization platforms 610a-b (e.g., substantially similar or identical to the virtualization platform 508). The cloud reseller 602 of the illustrated example relies on the virtualization platforms 610a-b of the third-party cloud services 606a-b to aggregate resources requested by the tenant 304.

In the illustrated example of FIG. 6, the CCN 200 is in communication with one or more of the CCNs 608a-b to provide the tenant 304 with seamless access to virtualized resources provided by one or more of the virtualization platforms 610a-b. In the illustrated example of FIG. 6, a tenant API client 208 (FIG. 2) of the CCN 200 is used to aggregate virtual resources into the cloud resource pool 212 (FIG. 2) from one or more of the virtualization platforms 606a-b run by the third-party cloud provider(s) 604. For example, to aggregate resources from the third-party cloud provider(s) 604, the tenant API client 208 of the CCN 200 communicates with one or more tenant API provider(s) (e.g., substantially similar or identical to the tenant API providers 206a-c of FIG. 2) of corresponding ones of the CCNs 608a-b. In such examples, the tenant API provider(s) of the CCN(s) 608a-b acknowledge or treat the tenant API client 208 of the CCN 200 as a tenant that requests resources from the CCN(s) 608a-b. Inter-cloud interactions between the CCN 200 and the CCN(s) 608a-b to aggregate resources requested by the tenant 304 are transparent to the tenant 304. In the illustrated example, the CCN 200 and the CCN(s) 608a-b perform such inter-cloud interactions without the tenant 304 being aware or needing to manage any of the inter-cloud interactions. In this manner, the tenant 304 is unaware of whether resources delegated to it are from the cloud reseller 602 or one or more of the third-party cloud providers 604. In some examples, the tenant 304 is not even aware of the identities of the third-party cloud providers 604 and/or that the cloud reseller 602 is using resources of the third-party cloud providers 604. Under a reseller business model, the cloud reseller 602 may change backend cloud resource providers (e.g., the third-party cloud provider(s) 604 of FIG. 6) based on changes in price or quality. In some examples, the reseller 602 may also offer additional services (e.g., web portals or graphical user interfaces for accessing cloud resources, failover processes, authentication processes, etc.) to tenants.

In the illustrated example, the cloud reseller 602 uses one of the tenant API providers 206*a-c* (FIG. 2) to delegate to the tenant 304 virtual resources (e.g., VMs) aggregated from one or more of the third-party cloud services 606*a-b*. In the illustrated example, user authentications of the tenant 304 and permissions are enforced by the AAA service 224 (FIG. 2) of the CCN 200 at the cloud reseller 602 based on user and account information of the enterprise 302 and/or of the cloud reseller 602. In some examples, the CCNs 608*a-b* of the third-party cloud services 606*a-b* implement corresponding AAA services (e.g., substantially similar or identical to the AAA service 224) to perform user authentications and/or enforce permissions on communications from the CCN 200. In such examples, the third-party cloud providers 604 treat the CCN 200 as a user or tenant of their services and enforce their policies on the CCN 200 using their AAA services.

As shown in FIGS. 3-6, example CCNs disclosed herein can be connected to virtualization platforms (e.g., the virtualization platform 214 of FIGS. 2-5, the virtualization platform 508 of FIG. 5, and/or the virtualization platforms 610*a-b* of FIG. 6) and/or connected to tenant API providers (e.g., the tenant API providers 210 of FIG. 2) of other CCNs (e.g., the CCNs 108 of FIG. 1, the CCN 506 of FIG. 5, and/or the CCNs 608*a-b* of FIG. 6). As such, disclosed example CCNs enable multi-level nesting of cloud services to aggregate resources from a plurality of cloud services for seamless access by tenants. For example, as discussed above, some entities may run their own virtualization platforms to aggregate their own resources. Some entities may communicate with external third-party cloud providers to aggregate external third-party resources with their own resources aggregated using their own virtualization platforms. Yet other entities may build business models on reselling access to resources aggregated from other third-party cloud providers without expending any capital on acquiring and maintaining their own resources. In many architectures, disclosed example CCNs enable seamless access to resources aggregated across multiple cloud services while providing the ability to dynamically increase or decrease needed resources in real time and while protecting sensitive user and account information of tenants.

Figure 7:
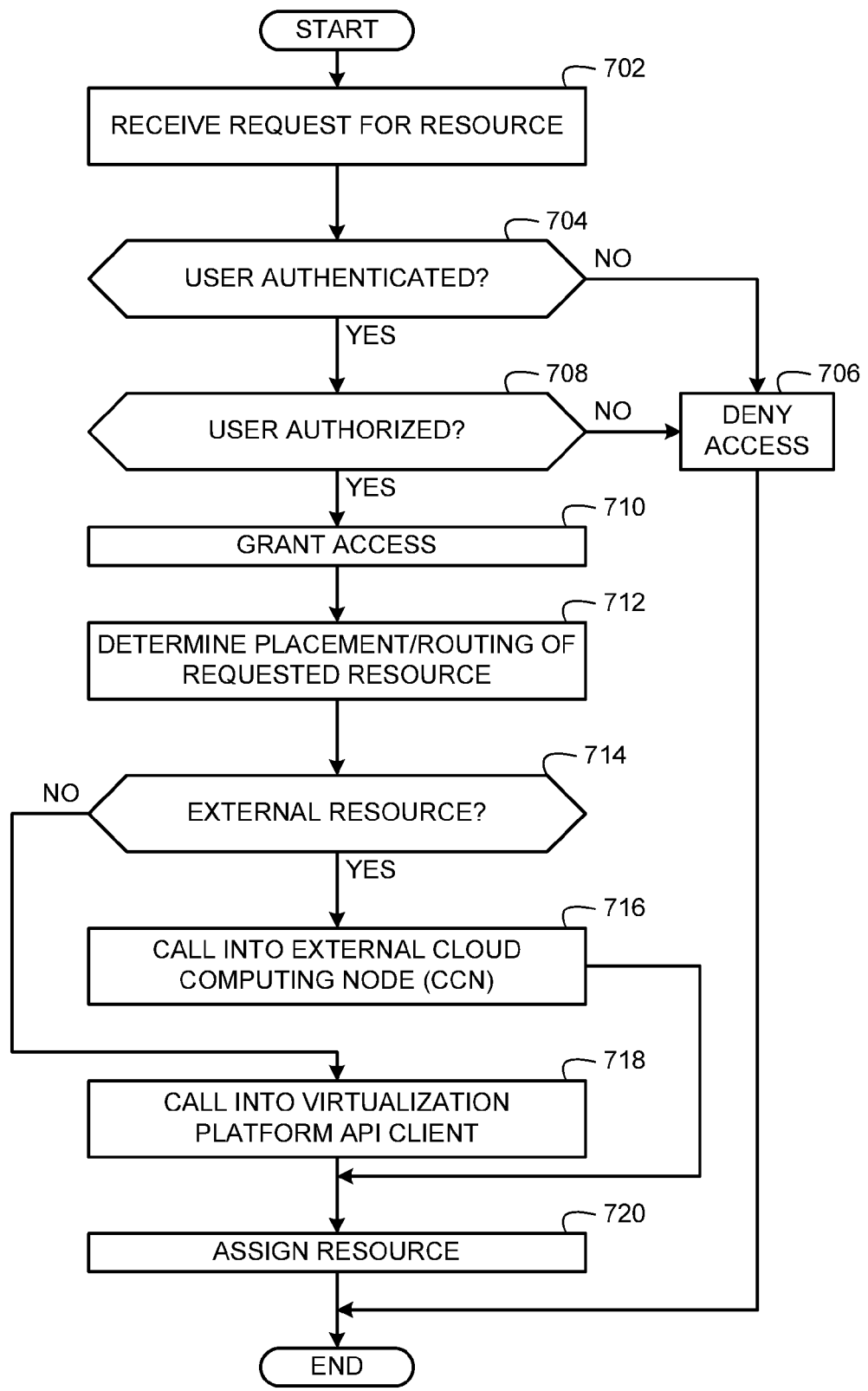
FIG. 7 is a flow diagram representative of example machine readable instructions that may be used to implement the CCN of FIG. 2 to implement one or more of the cloud architectures of FIGS. 3-6.

FIG. 7 is a flow diagram representative of example machine readable instructions that may be used to implement the CCN 200 of FIGS. 2-6 to implement one or more of the cloud architectures of FIGS. 3-6. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disc, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example CCN 200 may alternatively be used. For example, the order of execution of the blocks may be changed, and/or some of the blocks described may be changed, eliminated, or combined.

As mentioned above, the example process of FIG. 7 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example process of FIG. 7 may be implemented using coded instructions (e.g., computer readable instructions) stored on a non-transitory computer and/or machine readable storage medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Turning to the example process of FIG. 7, initially a tenant API provider receives a request for a resource (block 702). For example, the tenant API provider 206*a* (FIG. 2) of the CCN 200 may receive the request from the tenant 304 (FIGS. 3-6). The AAA service 224 (FIG. 2) determines whether the user of the tenant 304 making the request is authenticated (block 704). For example, the AAA service 224 performs an authentication procedure to determine whether the requesting user is known (e.g., whether the user is registered with the CCN 200). In some examples, the AAA service 224 performs the authentication based on an account of a VDC (e.g., the VDC 222*a*) through which the user is requesting the resource. If the AAA service 224 determines at block 704 that the requesting user is not authenticated, the AAA service 224 denies the user access (block 706) to the requested resource, and the example process of FIG. 7 ends.

If the requesting user is authenticated at block 704, the AAA service 224 determines whether the user is authorized (block 708). For example, the AAA service 224 performs an authorization procedure to determine whether the requesting user has permissions authorizing the user to access the requested resource. If the AAA service 224 determines at block 708 that the requesting user is not authorized to access the requested resource, the AAA service 224 denies the user access (block 706) to the requested resource, and the example process of FIG. 7 ends.

If the requesting user is authorized at block 708, the AAA service 224 grants the user access (block 710) to the requested resource. In the illustrated example, the CCN 200 grants the requesting user access to the resource without exposing to the user whether the resource is an internal resource or an external resource. In this manner, the requesting user can access the resource via the CCN 200 in a seamless manner regardless of whether the resource is an internal resource aggregated internally by the CCN 200 or an external resource aggregated externally via another CCN. The tenant API provider 206a determines the placement/routing of the requested resource (block 712). For example, the tenant API provider 206a determines the location of a VM corresponding to the requested resource. In some examples, the location of the requested resource is in the same cloud service as the CCN 200 that received the tenant request such as in, for example, the internal cloud architecture 300 of FIG. 3, the external cloud architecture 400 of FIG. 4, and/or the internal cloud service 502 of FIG. 5. In other examples, the requested resource is an external resource located in an external cloud service separate from the CCN 200 that received the tenant request such as in, for example, the external cloud service 504 of FIG. 5 and the third-party cloud services 606a-b of FIG. 6.

If the requested resource is an external resource (block 714), a tenant API client 208 (FIG. 2) calls into an external CCN (block 716) to request the resource. For example, the tenant API client 208 of the CCN 200 may request the resource from the CCN 506 in the hybrid cloud architecture 500 of FIG. 5 and/or may request the resource from one of the CCNs 608a-b in the cloud reseller architecture 600 of FIG. 6. In the illustrated example, the resource accessed through another CCN external to the CCN 200 via the tenant API client 208 is an external resource.

If the requested resource is not an external resource (block 714) (e.g., the requested resource is an internal resource), the tenant API provider 206a requests use of the resource through the virtualization platform API client 220 (FIG. 2) (block 718). For example, the tenant API provider 206a calls into the VDC 222a (FIG. 2) to request use of the resource through the virtualization platform API client 220. In the illustrated example, the resource accessed through the virtualization platform API client 220 is an internal resource available directly through the CCN 200 without needing to be accessed through another CCN (e.g., the CCN 108 of FIG. 1, the CCN 506 of FIG. 5, or the CCNs 608a-b of FIG. 6). After requesting the resource at block 716 or block 718, the CCN 200 assigns the resource (block 720) for use by the requesting user. The example process of FIG. 7 then ends.

Figure 8:
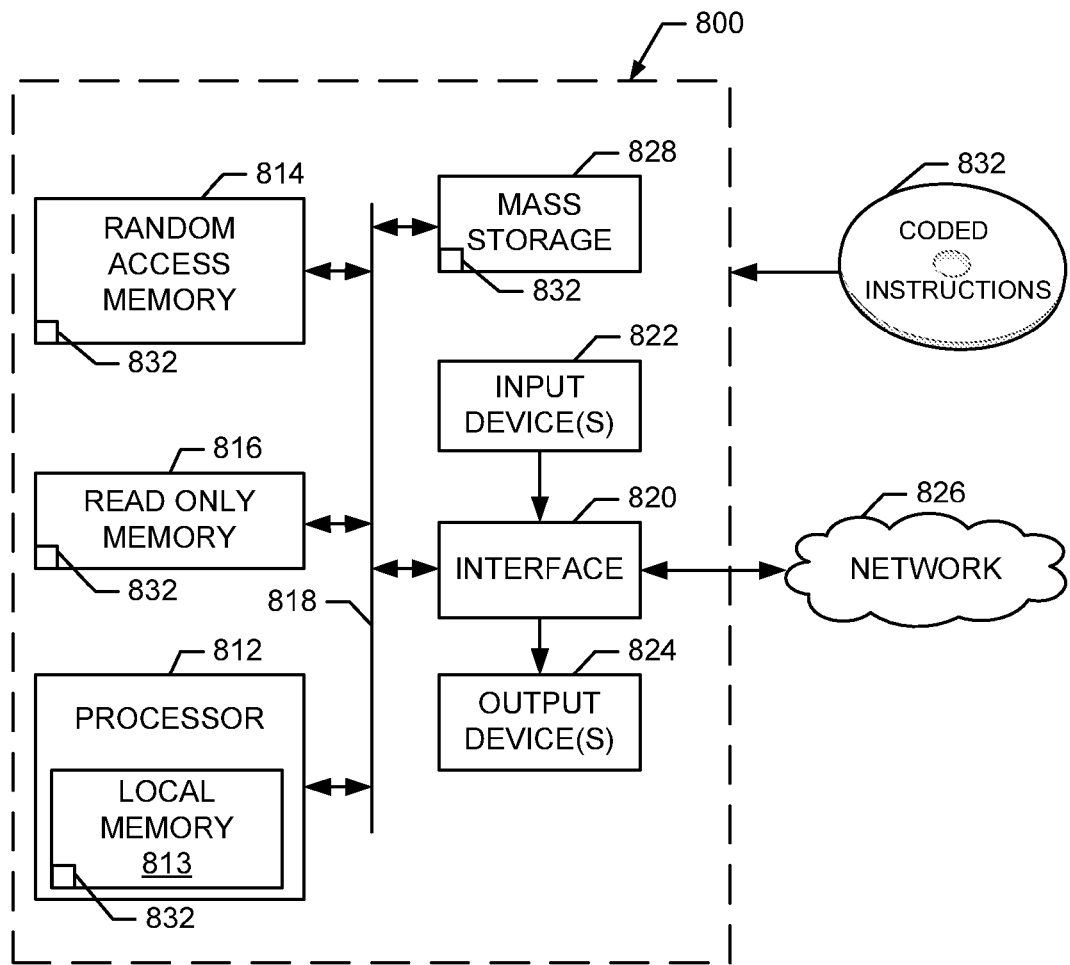
FIG. 8 is a block diagram of an example processor system that may be used to implement the CCN of FIG. 2.

FIG. 8 is a block diagram of an example processor platform 800 capable of executing the instructions of FIG. 7 to implement the CCN 200 of FIGS. 2-6 to implement one or more of the cloud architectures of FIGS. 3-6. The processor platform 800 can be, for example, a server, a personal computer, and/or any other suitable type of computing device.

The processor platform 800 of the instant example includes a processor 812. The processor 1012 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a liquid crystal display, a cathode ray tube display (CRT), a printer and/or speakers). The interface circuit 820 of the illustrated example, thus, typically includes a graphics driver card, graphics driver chip or graphics driver processor.

The interface circuit 820 of the illustrated example also includes a communication device such as a transmitter, a receiver, a transceiver, a modem or a network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives, compact disks, Blu-ray disk drives, RAID systems, and digital versatile disk (DVD) drives.

Coded instructions 832 (e.g., to implement the example process of FIG. 7) may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to aggregate resources in a cloud, the method comprising:

receiving, by executing a first instruction with a processor, a first request for a resource at an application programming interface in an internal cloud service, the application programming interface including a first tenant application programming interface provider and a tenant application programming interface client, the first request received via the first tenant application programming interface provider;

when the resource is an internal resource provided by the internal cloud service, using, by executing a second instruction with the processor, a virtualization platform application programming interface client of the internal cloud service to access the resource; and when the resource is an external resource provided by an external cloud service different from the internal cloud service, using, by executing a third instruction with the processor, the tenant application programming interface client in the internal cloud service, different from the virtualization platform application programming interface client, to send a second request for the resource to a second tenant application programming interface provider in the external cloud service.

2. The method as defined in claim 1, further including deploying a virtual machine via a virtual data center to provide a tenant with access to the resource.

3. The method as defined in claim 1, wherein the internal cloud service is an infrastructure as a service.

4. The method as defined in claim 1, wherein the first tenant application programming interface provider and the tenant application programming interface client of the same application programming interface are in a first cloud computing node of the internal cloud service, and the second tenant application programming interface provider is in a second cloud computing node of the external cloud service.

5. The method as defined in claim 4, further including performing first authentication procedures on a tenant using a first service in the first cloud computing node, the second cloud computing node performs second authentication procedures on the first cloud computing node using a second service in the second cloud computing node.

6. The method as defined in claim 1, wherein the first tenant application interface provider and the tenant application programming interface client do not expose whether the resource is provisioned from the internal cloud service or the external cloud service to the tenant.

7. An apparatus to aggregate resources in a cloud, the apparatus comprising:
a memory including machine readable instructions; and
a processor to execute the instructions to implement:
a first tenant application programming interface provider of an application programming interface in an internal cloud service, the first tenant application programming interface provider to communicate with a first virtual data center of the internal cloud service;
a cloud resource pool of aggregated resources, at least some of the aggregated resources to be accessed via the first virtual data center by a tenant via the first tenant application programming interface provider;
a virtualization platform application programming interface client to aggregate at least some resources of the internal cloud service into the cloud resource pool; and
a tenant application programming interface client of the application programming interface in the internal cloud service, the tenant application programming interface client being different from the virtualization platform application programming interface client, the tenant application programming interface client to communicate with the cloud resource pool, the tenant application programming interface client to communicate with a second tenant application programming interface provider in an external cloud service different from the internal cloud service, and to aggregate at least some resources from the external cloud service.

8. The apparatus as defined in claim 7, wherein the first virtual data center is to run a virtual machine to provide the tenant with access to the resources.

9. The apparatus as defined in claim 7, wherein the internal cloud service is an infrastructure as a service.

10. The apparatus as defined in claim 7, wherein the first tenant application programming interface provider and the tenant application programming interface client of the same application programming interface are in a first cloud computing node of the internal cloud service, and the second tenant application programming interface provider is in a second cloud computing node of the external cloud service.

11. The apparatus as defined in claim 10, further including a first service in the first cloud computing node to perform first authentication procedures on the tenant, the second cloud computing node having a second service to perform second authentication procedures on the first cloud computing node.

12. The apparatus as defined in claim 7, wherein the internal cloud service is provided by an organization of the tenant, the external cloud service is provided by a third-party cloud provider, and the first tenant application programming interface provider and the tenant application programming interface client do not expose whether the resources are provisioned from the internal cloud service or the external cloud service to the tenant.

13. A tangible computer readable storage medium comprising instructions that, when executed, cause a processor to at least:
when a resource requested from a first tenant application programming interface provider in an internal cloud service is an internal resource provided by the internal cloud service, use a virtualization platform application programming interface client of the internal cloud service to access the resource; and
when the resource is an external resource provided by an external cloud service different from the internal cloud service, use a tenant application programming interface client in the internal cloud service, different from the virtualization platform application programming interface client, to send a request for the resource to a second tenant application programming interface provider in the external cloud service.

14. The tangible computer readable storage medium as defined in claim 13, wherein the instructions further cause the processor to deploy a virtual machine in a virtual data center to provide a tenant with access to the resource.

15. The tangible computer readable storage medium as defined in claim 13, wherein the internal cloud service is an infrastructure as a service.

16. The tangible computer readable storage medium as defined in claim 13, wherein the first application programming interface provider and the tenant application programming interface client are in a first cloud computing node of the internal cloud service, and the second tenant application programming interface provider is in a second cloud computing node of the external cloud service.

17. The tangible computer readable storage medium as defined in claim 16, wherein the instructions further cause the processor to perform first authentication procedures on a tenant using a first service in the first cloud computing node, and the instructions cause the second cloud computing node to perform second authentication procedures on the first cloud computing node using a second service in the second cloud computing node.

18. The tangible computer readable storage medium as defined in claim 13, wherein the instructions further cause the processor to not expose to the tenant whether the resource is provisioned from the internal cloud service or the external cloud service.

19. A cloud computing infrastructure comprising:
a first cloud computing node in a first cloud internal to an enterprise;
a virtualization platform application programming interface client associated with the first cloud computing node, the virtualization platform application programming interface client to provide a user with access to first resources internal to the enterprise; and a tenant application programming interface client, different from the virtualization platform application programming interface client, to provide the user with access to second resources of an external cloud architecture, the first cloud computing node to communicate with a second cloud computing node in a second cloud external to the enterprise via the tenant application programming interface client to provide the access to the second resources.

20. The cloud computing node as defined in claim 19, wherein the first cloud computing node provides access to the first and second resources without informing the user that the second resources are external to the enterprise.

* * * * *